(12) United States Patent
Bian

(10) Patent No.: US 7,377,449 B2
(45) Date of Patent: May 27, 2008

(54) SYNCHRONOUS TWO-DIMENSIONAL BARCODE SYSTEM WITH ALL-AROUND INFORMATION, AND READING METHOD THEREOF

(75) Inventor: Longxiang Bian, Shanghai (CN)

(73) Assignee: LP Technologies (Shanghai) Inc., Shanghai (CN)

( * ) Notice: Subject to any disclaimer, the term of this patent is extended or adjusted under 35 U.S.C. 154(b) by 158 days.

(21) Appl. No.: 10/553,890

(22) PCT Filed: Apr. 12, 2004

(86) PCT No.: PCT/CN2004/000337

§ 371 (c)(1),
(2), (4) Date: Mar. 14, 2006

(87) PCT Pub. No.: WO2004/095357

PCT Pub. Date: Nov. 4, 2004

(65) Prior Publication Data

US 2006/0255163 A1     Nov. 16, 2006

(30) Foreign Application Priority Data

Apr. 23, 2003   (CN) ............................... 03 1 16561

(51) Int. Cl.
   *G06L 19/06* (2006.01)
(52) U.S. Cl. ............ 235/494; 235/462.01; 235/462.09; 235/462.1
(58) Field of Classification Search ........... 235/462.09, 235/462.1, 462.11, 469, 494
   See application file for complete search history.

(56) References Cited

U.S. PATENT DOCUMENTS

| | | | |
|---|---|---|---|
| 4,782,221 A | 11/1988 | Brass et al. | |
| 5,591,952 A * | 1/1997 | Krichever et al. | 235/462.11 |
| 5,591,956 A * | 1/1997 | Longacre et al. | 235/462.1 |
| 6,201,901 B1 | 3/2001 | Zhou et al. | |
| 6,418,244 B2 | 7/2002 | Zhou et al. | |
| 6,560,741 B1 | 5/2003 | Gerety et al. | |

FOREIGN PATENT DOCUMENTS

| | | |
|---|---|---|
| CN | 1245944 | 3/2000 |
| CN | 1344399 | 8/2000 |

\* cited by examiner

*Primary Examiner*—Seung Ho Lee
(74) *Attorney, Agent, or Firm*—Connolly Bove Lodge & Hutz LLP

(57) ABSTRACT

A system for a two dimension bar code for synchronous omni-directional information and its identifying method are disclosed with advantages of simple in identifying, low requirement on scanner synchronization and high in ability to identifying with anti-aberration. The system for the two dimension bar code is composed of units aligned in a matrix form and comprises a pair of vertical synchronous information units at two opposing borders in said matrix; a pair of horizontal synchronous information units at another two opposing border in said matrix; a directing information unit having a characteristic shape and/or optic characteristics for identifying a scanning direction and having a specific relative positional relationship between said vertical information synchronous units and horizontal information synchronous units; and a coding information unit inside said matrix, wherein the base of each unit is in the vicinity of the intersection of the central linking line of a pair of the vertical synchronous information units and the central linking line of a pair of horizontal synchronous information units.

14 Claims, 3 Drawing Sheets

SYNCHRONOUS TWO-DIMENSIONAL BARCODE SYSTEM WITH ALL-AROUND INFORMATION, AND READING METHOD THEREOF

RELATED APPLICATIONS

This application is a national stage application (under 35 U.S.C. 371) of PCT/CN2004/000337 filed Apr. 12, 2004 which claims benefit of the Chinese patent application 03116561.3 filed Apr. 23, 2003.

TECHNICAL FIELD

The present invention relates to a bar code technique, and in particular to a novel system for two dimension bar codes and its identifying method.

BACKGROUND ART

A bar code is a special optical sign system readable to an optical scanning device, which can be divided into 1-dimensional or two dimension bar code according to its spatial dimensions involved.

A code form for a 1-dimensional bar code is a combination of color bars and space bars with different widths along one direction, and the method and system for its identification are simple and thus is widely adopted in various fields. A typical 1-dimensional bar code includes UPS-bar code, EAN-bar code and 128-bar code. Since a 1-dimensional bar code contains little information, it is jointly used as a piece of index information together with a database.

A two dimension bar code can have two categories: a stack bar code and a rectangular bar code hereinafter referred to as a matrix code. The stack bar code is a two dimension bar code developed from the 1-dimensional bar code and is constituted through stacking multiple sets of 1-dimensional bar codes and in this regard, it contains a little more information than that a two dimension bar code does. A typical stack bar code such as PDF417 may store alphas up to 1K and could be higher if "jointing" signs have been accounted for. The defect of a stack bar code could be large in area, low in information intensity and thus is not suited for a small object. The coding principle and its configuration for a matrix code is entirely different from a 1-dimensional bar code or a stack code with the former adopting "a cell" or "a block", hereinafter referred to as a matrix element, as a basic information unit. The binary optic characteristic of the matrix element represents a binary 0 or 1. A typical matrix code includes Data Matrix, MaxiCode and QR codes, etc. This kind of binary code has a major merit of high intensity of information, small area of code occupation and greater inclusion in printing and identifying due to its stronger error-correcting function provided through encoding.

To identifying a bar code normally requires adoption of a two dimension charge coupling device (CCD) as a scanner for an identifying device. During the identification, the light rays directed onto a heavily colored matrix element are absorbed but those directed onto a lightly colored matrix element are reflected back to the scanner. The scanner sequentially converts the intensity of the reflective light from each matrix element into a corresponding electrical signal and further into a digital signal by means of an analog to digital converter. A decoder translates these digital signals into message contents according to an algorithm.

Among these bar codes, in order for accurately locating each matrix elements, it is necessary to strictly synchronize the two mutually perpendicular scanning steps or otherwise the bar codes obtained through scanning will be distorted so as to affect the accuracy of the identification. This further leads to a very high requirement on the synchronism to the identifier and on the printing quality of a bar code, as well as expensive cost of the devices and the printing, and thus heavily block the popularization and the application of the two dimension bar code. This is the very reason the application of the two dimension bar code is only limited to high tech fields since its creation a decade ago.

To solve this problem in scanning synchronization, a special information unit for scanning synchronization, i.e. a synchronous information unit, is introduced into some rectangular bar codes. These units are disposed at a specific location where a rectangular bar code is located for embodying synchronous scanning along a longitudinal direction. To facilitating an identifying process, e.g. when in a Data Matrix bar code, the information synchronous unit is disposed at the two perpendicular neighboring borders of the bar code area. However these synchronous controlling information still can not lower any requirement on the scanner's synchronization. Taking a Data Matrix bar code as an example, in order for ensuring all coded information units in a scanned two dimension bar code to have identical size and a rectangular shape, it is required that the horizontal scanning of the scanner strictly synchronizes with its vertical scanning so as to ensure non-aberration and non-distortion of the image. This requires high accuracy in synchronization to the scanner and thus leads to a high cost to the identifying device.

SUMMARY OF THE INVENTION

The object of the invention is to provide a system for a two dimension bar code for synchronous omni-directional information which has advantages of simple in method of identification, low in synchronous requirement on the scanner and high in ability to anti-aberration identification.

This inventive object is realized through following technical solution:

a system for a two dimension bar code for synchronous omni-directional information, constituted by units arranged in a matrix form, comprising:

vertical synchronous information units disposed at two of opposing borders in said matrix, wherein the optical characteristics of the neighboring units are different and the units at different borders constitute a pair of vertical synchronous information units;

horizontal information units disposed at another two opposing borders of said matrix, wherein the optical characteristics of the neighboring units are different and the units at different borders constitute a pair of horizontal synchronous information units;

directing information units having a characteristic shape and/or optical characteristic for identifying a scanning direction and having a relative positional relationship with said vertical information synchronous units and horizontal information synchronous units; and coded information units inside said matrix, wherein the base of each unit is at the nearby to the junction of the central line of a pair of the vertical synchronous information units and the central line of a pair of the horizontal synchronous information units.

It is preferable that in said system for a two dimension bar code for synchronous omni-directional information, the optical characteristics for each unit is its color attribute and said base is the center of each unit.

It is preferable that in said system for a two dimension bar code for synchronous omni-directional information, said vertical synchronous information units and horizontal synchronous information units are all distributed at said matrix border, and said directing information units are at the center of the matrix vertex and the border.

It is preferable that in said system for a two dimension bar code for synchronous omni-directional information, each of said vertical synchronous information units, horizontal synchronous information units and coded information units is a square, said directing information unit is any one from a rectangle, a square or a circle.

Another object of the invention is to provide a method for identifying a two dimension bar code for synchronous omni-directional information, which has advantages of simple in realization, low in requirement on synchronization of the scanner and high in ability to the anti-aberration identification.

The object of the invention is realized through following technical solution:

a method for identifying a two dimension bar code, the identifying device identifies an input image of said system for a two dimension bar code for synchronous omni-directional information in accordance with the following steps:

determining its position in the image based on the characteristics and/or optical characteristics of a directing information unit;

determining a linking line between each pair of the vertical synchronous information unit and the horizontal information unit based on the specific relative positional relationship of the directing information unit with the vertical synchronous information unit and the horizontal information unit as well as the optic characteristics of the vertical synchronous information unit and the horizontal information unit;

reading optical characteristic information at the vicinity of the linking line between the centers of said pair of vertical synchronous information units and the intersection between said pair of horizontal synchronous information units; and decoding the optical characteristic information at the vicinity of the intersection read by step (3) in accordance with the order identified by the characteristic shape and/or optical characteristics of the directing information unit, so as to recover the coded information.

It is preferable that in said method for identifying the two dimension bar code, the optical characteristics for each unit is its color attribute and said base is the center of each unit.

It is preferable that in the system for a two dimension bar code for synchronous omni-directional Information, the optical characteristics of each unit is its fluorescent attribute and said base is the center of each unit.

It is preferable that in said method for identifying the two dimension bar code, said vertical synchronous information units and horizontal synchronous information units are all distributed at said matrix border, and said directing information units are at the matrix vertex and the center of the border. The identifier determines the directing information unit at the border center by the directing information unit at neighboring matrix vertex.

It is preferable that in said method for identifying the two dimension bar code, each of said vertical synchronous information units, horizontal synchronous information units and coded information units is a square, said directing information unit is any one from a rectangle, a square or a circle. Said identifier determines a scanning direction through comparing its geometric shape and its position.

It is preferable that in said method for identifying the two dimension bar code, the centers of the vertical synchronous information units and the horizontal synchronous information units at a border are determined by a border searching algorithm.

In the two dimension bar code of the invention, the center of each coded information unit can be determined uniquely by the vertical and the horizontal synchronous information units at a matrix border, and when an aberration happens to an scanned image because of variation in scanning speed, the shape of each unit may also basically happens to be in a synchronous aberration. Therefore the center of the coded information unit can also be precisely determined by the center of the vertical and the horizontal synchronous information. In this regard, the system for a two dimension bar code for synchronous omni-directional Information according to the present invention may significantly lower the requirement on synchronization of the identifying device and thus have very high ability to the anti-aberration identification.

BRIEF DESCRIPTION OF THE DRAWINGS

The aforesaid objects, characteristics and the advantages of the present invention may become apparent from the preferred embodiments of the invention with reference to the accompanying figures, in which.

A PREFERRED EMBODIMENT OF THE INVENTION

The basic concept of the invention is that, for each coded information unit of a matrix bar code, its reference position can be uniquely determined by the vertical and horizontal synchronous information unit, and the aberration information of the coded information unit can also be determined by a synchronous unit. Therefore in the present invention, a grid structure is composed of a pair of the vertical and horizontal synchronous information distributed at the matrix border. The reference position of the coded information unit is at an inner grid point, i.e. at the intersection of the linking line of the reference point of the pair of the vertical and the horizontal synchronous information. When scanning is done asynchronously, the relative locations of each pair of the vertical synchronous information units, the horizontal synchronous information unit and the coded information units inside the matrix at the relative matrix border are substantially not changed, although certain deformation may occur to the grid, and in this regard, the position of the coded information unit in the aberrant image can still be precisely determined.

A preferred embodiment of the present invention is now described in reference to the accompanying figures.

Figure 1:
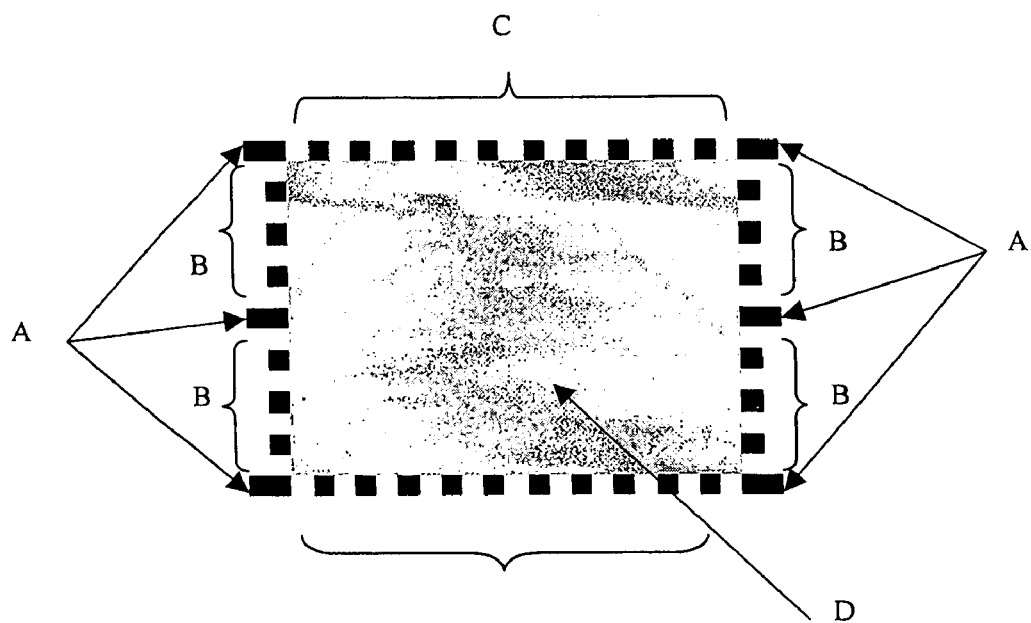
FIG. 1 schematically shows a system for a two dimension bar code for synchronous omni-directional information according to a preferred embodiment of the present invention.

FIG. 1 schematically shows a preferred embodiment according to a system for a two dimension bar code for synchronous omni-directional information of the present invention. In the preferred embodiment, the system for a two dimension bar code for synchronous omni-directional information of the present invention is also referred to be as a LP code.

As a matrix code, the LP code is composed of units arranged in a matrix form. Each unit adopts certain optic characteristics to indicate its code value, and the usual optic characteristic is color attribute and may adopt other optic characteristic, for instance, the lighting characteristics under a fluorescent radiation. For simplification, it is here assumed that the optical characteristics of the LP code is the color attribute and includes two colors of black and white. All the units of the LP code is divided into four categories: directing information unit, vertical synchronous information unit, horizontal synchronous information unit and coded information unit, that will be respectively described in reference to FIG. 1.

As shown in FIG. 1, six black directing information units A are disposed at the four vertexes of the matrix area and at the centers of two vertical borders. The directing information units at the vertexes are in a rectangle shape and their longer sides are in parallel in a horizontal direction. It can be seen from the description below that the directing information unit A is on one hand taken as a reference for determining other units, and indicates on the other hand the scanning direction or the direction for information storage. In particular, since the coded information is stored in the coding area in accordance to a certain order, e.g. in a line-by-line or column-by-column way, it is necessary to sequence the code values of the coded information units in accordance to the direction indicated by the directing information unit A before decoding the coded information, and so as to obtain the correct decoding result.

Alternative color changing vertical synchronous information unit B and horizontal synchronous information unit C are disposed between the matrix border and neighboring directing information unit A, wherein vertical synchronous information unit B is disposed at two vertical borders and the horizontal information unit C is disposed at two horizontal borders. These units are mainly used to determine the location of the coded information unit.

Coded area shown by the shaded portion in FIG. 1 is composed by the coded information unit inside the matrix and effective information of the decodes of the LP codes.

Figure 2:
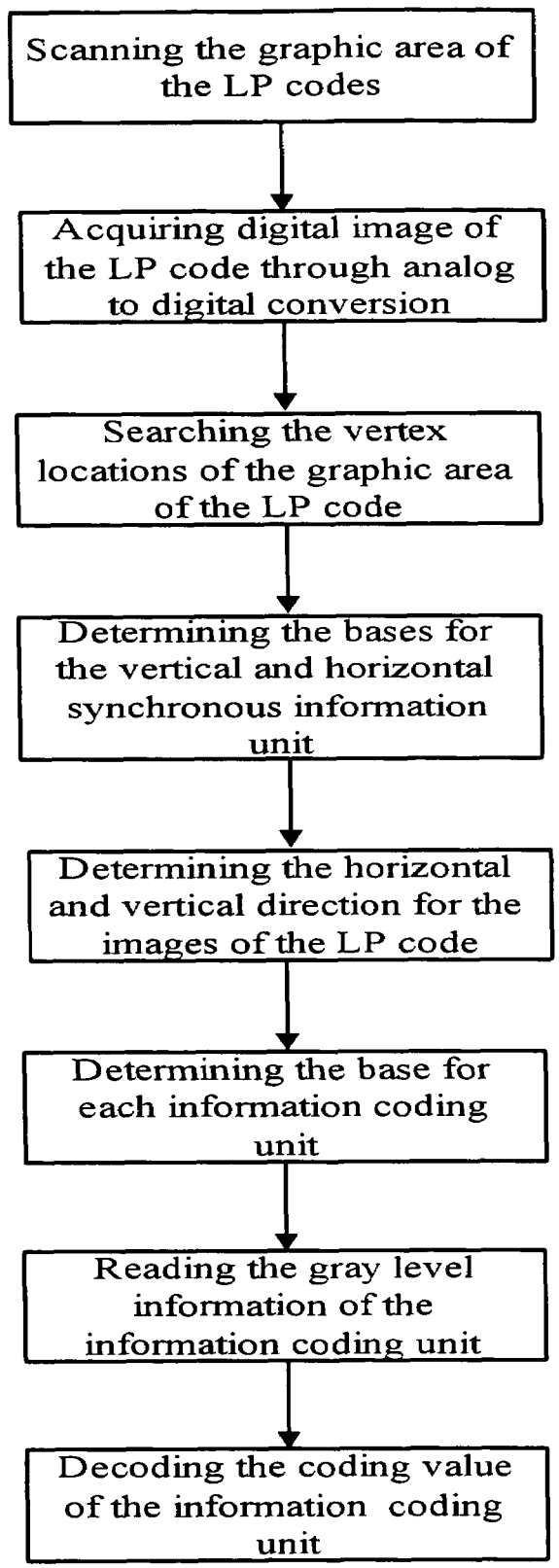
FIG. 2 is a flowchart describing the identifying method for the system for a two dimension bar code for synchronous omni-directional information according to the present invention.

Flowchart of the LP code identifying method is now described in reference to FIG. 2. As shown in FIG. 2, in step 1, the scanner of the identifying system performs 2-dimenssional scanning to the LP code area of the structure printed as shown in FIG. 1. In the scanning process, the optical signal of each pixel point in the LP code image is converted by the scanner into an analog electric signal. The scanner generally adopts a CCD or other optical to electrical converting elements. It can be seen from below that the scanning in the horizontal and the vertical directions are not necessary to be synchronous due to the very high anti-aberration ability of the LP code and thus an image pick-up device such as a 1-dimenssional CCD of low price can be selected.

In step 2, a analog converter converts the analog electrical signal for picking up an image into a digital electric signal in order for obtaining the digital image in the LO code area, and stores the digital image in the image storage for subsequent identifying processing. If the horizontal scanning is synchronous with the vertical scanning, the scanned image without aberrant LP codes as shown in FIG. 3 is thus obtained or otherwise an aberrant LP codes will be obtained instead such as the aberrant scanning image as shown in FIG. 3b. Moreover, if the major axis of the image picking-up system is not parallel to the bar code plane, a perspective aberrant image as shown in FIG. 3c will be produced.

Subsequently, in step 3, the digital graphic processor picks up the optical characteristics or the gray level of the information coding unit in the digital image of the LP code shown in the figure. Step 3 includes following steps.

Firstly, in step 3a, the digital graphic processor adopts a corresponding algorithm to search the four vertexes of the LP code area as shown in FIG. 1 based on the shape characteristics of the directing information unit 15. Since the algorithms here adopted are all general algorithms for 2-dimenssional bar codes known in the art and not the inventive aspects of the present invention, they will not be further elucidated.

Then in step 3b, certain border searching method is adopted to look for a set of color alternatively changing horizontal synchronous information units at the horizontal border, in which reference 17 indicates black units and 18 indicates white units, or a set of color alternative changing vertical synchronous information units at the vertical border, in which reference 19 indicates black units and 20 indicates white units, as well as a intermediate directing information units 16 at the center of the vertical border of the matrix, and determines all the bases of the vertical synchronous information units 19, 20 and horizontal synchronous information units 17 and 18.

A so-called base can be appreciated as a specific location in each unit. Since the shape of a unit may happen to be aberrant, the base should be appreciated to be a certain relative location such as a center point of each unit or a center point at the border as shown by the dots for references in FIGS. 3a to 3b. It should be noted that in the present embodiment, since the white color being the background color, the white units 18 and 20 in the figure may integrate with the background and thus are unable to directly determine the borders of the units of the category. Since the colors of the synchronous information units are changing alternatively, the border of a white unit between them is determined by using two neighboring black units and thereby the base is determined.

In step 3c, the horizontal direction and the vertical direction of an LP code are determined based on the characteristics of all the searched directing information units. In the present embodiment, the length sum along a direction of these directing information units are compared with that along another direction, and the direction along which the length sum is greater is determined to be the horizontal direction of the LP code but another direction to be the vertical direction. Since the coded information is always aligned according to a certain order, the aligning order of the coded information can be determined through determining the horizontal direction and the vertical direction of the LP code.

In step 3d, the base location of the coded information unit of each LP code is determined based on the base points of all the vertical synchronous information units 19 and 20 as well as the horizontal information units 17 and 18 at the four search borders.

The vertical synchronous information units at the left and right borders mutually correspond one after another. For instance, the first vertical synchronous information unit from the upper vertex at the left border corresponds to the first vertical synchronous information unit from the upper vertex at the right border; the second vertical synchronous information unit correspond to the second vertical synchronous information unit from the upper vertex at the right border; and so on. The last vertical synchronous information unit ended at the lower vertex at the left border corresponds to the last vertical synchronous information unit ended at the lower vertex at the right border. In this way the two vertical synchronous information units at different borders form a pair of vertical synchronous information units. This also applies to the horizontal synchronous information units where the two horizontal synchronous information units at different borders form a pair of horizontal synchronous information units. Since the information coding units are aligned in a matrix form and their borders are aligned with the border of a vertical synchronous information unit and a horizontal synchronous information unit when in printing or contain a fixed positional relationship, the base positions of all the information coding units can be determined through calculating the connecting traces between the base points of these pairs of the vertical synchronous information units and the base points of the pairs of the horizontal and vertical synchronous information units and thereby calculating the intersections of these connecting traces.

In step 3*e*, the digital graphic processor reads the gray level at these intersection or at the vicinity of these intersection and treats them as coded values of the coded information units in the code area of the LP codes. The collection of these coded values are the effective information of the decodes of the LP codes. In order for lowering noise disturbance, generally the sum or the average of the gray levels in certain range in the vicinity of the intersection can be read as gray level information, but values resulted from processing by other mathematical methods can also be adopted as gray level information.

Finally, in step 4, decoder decodes the coding values extracted in step 3*e* based on the aligning order for the coding information determined in step 3*c* so as to obtain the text and graphic information such as pictures and fingerprints in the LP codes.

In the above embodiment, due to anisotropy of the shape of directing information unit A, the scanning direction can be determined in accordance with the shape. However other shapes such as ellipse, triangle or other geometric shapes, or even other characteristics of the directing information unit A can also be adopted to represent the scanning direction such as the anisotropy distribution in the space of the gray level for the pixels of the directing information unit A is adopted to represent the scanning direction. In the present embodiment, since directing information unit A is set at the vertexes of the matrix area, the position of the directing information unit A relative to the vertical and horizontal synchronous information units B and C can thus be quickly determined. However this does not mean that the directing information unit A has to be disposed at the vertex, but on the contrary, can be disposed at other places so long as the characteristic difference from other units can sufficiently be identified by a identifying device.

Figure 3A:
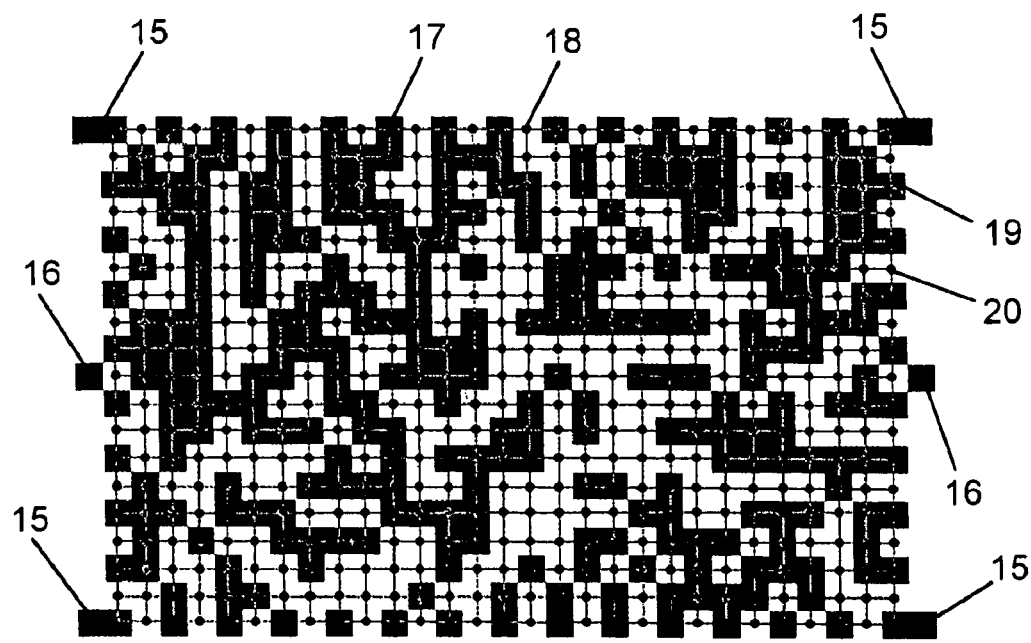
FIG. 3a schematically shows a scanned image with no aberration with the system for a two dimension bar code for synchronous omni-directional information shown in FIG. 1.
Figure 3B:
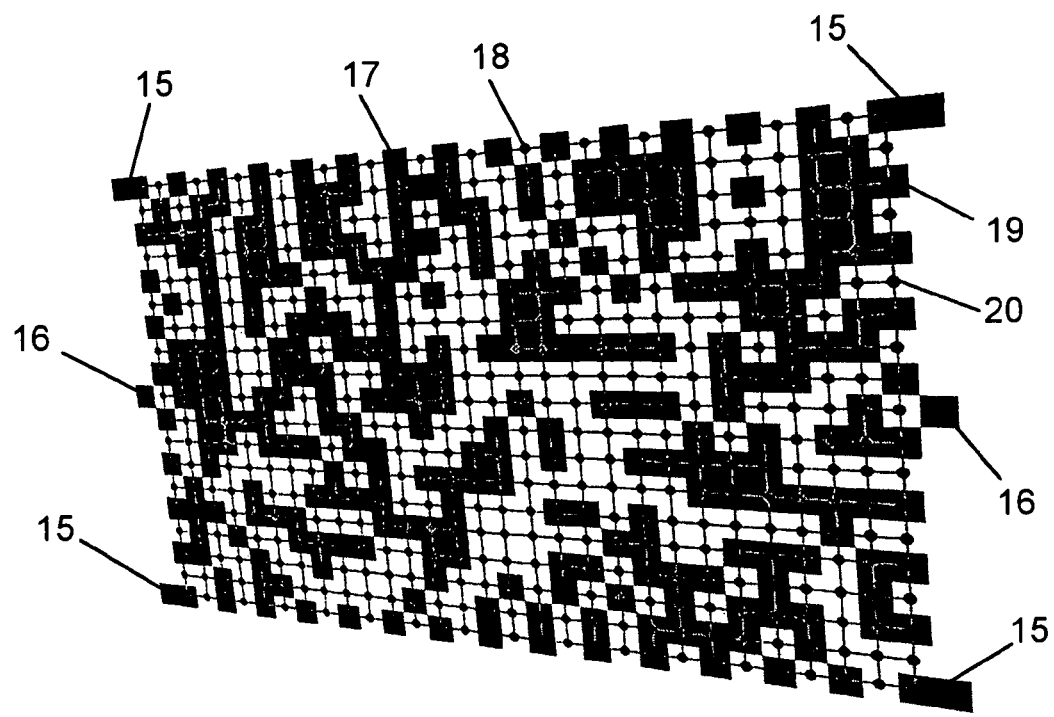
FIGS. 3b and 3c schematically shows a scanned image with aberration with the system for a two dimension bar code for synchronous omni-directional information shown in FIG. 1.
Figure 3C:
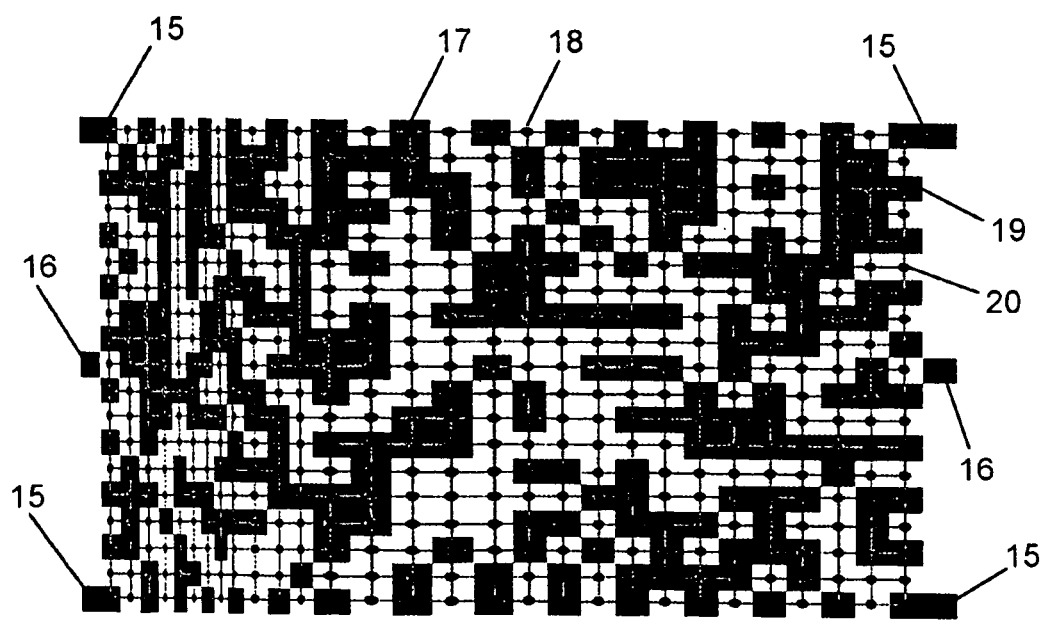

FIG. 3*a* shows a scanned image without any aberration, but FIGS. 3*b* and 3*c* shows scanned images with aberration. The comparison shows that in the scanned images with aberration, the grid structure formed by the base connection of a pair of vertical and horizontal synchronous information units happens to be aberrant, but the bases of the coded information units still lie in the vicinity of the inner grid points. And therefore the locations of the coded information units in the aberrant images can still be accurately determined and the gray level information of the coded information unit can be accurately determined.

The invention claimed is:

1. A system for a two dimensional bar code having information units arranged in the form of a matrix for synchronous omni-directional information, characterized in that, comprising:
   vertical synchronous information units disposed at two opposing borders in said matrix, wherein optical characteristics of the neighboring units are different and the units at different borders constitute a pair of vertical synchronous information units;
   horizontal synchronous information units disposed at another two opposing borders of said matrix, wherein optical characteristics of the neighboring units are different and the units at different borders constitute a pair of horizontal synchronous information units;
   directing information units having a characteristic shape and/or optical characteristic for identifying a scanning direction and having a relative positional relationship with said vertical synchronous information units and horizontal synchronous information units; and
   coding information units inside said matrix, wherein the base of each unit is at or near the junction of the central line of a pair of the vertical synchronous information units and the central line of a pair of the horizontal synchronous information units.

2. The system for a two dimensional bar code having information units arranged in the form of a matrix for synchronous omni-directional information according to claim 1, characterized in that, the optical characteristics for each unit are the unit color attribute and said base is the center of each unit.

3. The system for a two dimensional bar code having information units arranged in the form of a matrix for synchronous omni-directional information according to claim 2, characterized in that, said vertical synchronous information units and horizontal synchronous information units are all distributed at said matrix border, and said directing information units are at the center of the matrix vertex and the border.

4. The system for a two dimensional bar code having information units arranged in the form of a matrix for synchronous omni-directional information according to claim 3, characterized in that, each of said vertical synchronous information units, horizontal synchronous information units and coding information units is a square, said directing information unit is selected from a rectangle, a square or a circle.

5. The system for a two dimensional bar code having information units arranged in the form of a matrix for synchronous omni-directional information according to claim 1, characterized in that, said vertical synchronous information units and horizontal synchronous information units are all distributed at said matrix border, and said directing information units are at the center of the matrix vertex and the border.

6. The system for a two dimensional bar code having information units arranged in the form of a matrix for synchronous omni-directional information according to claim 5, characterized in that each of said vertical synchronous information units, horizontal synchronous information units and coding information units is a square, said directing information unit is selected from a rectangle, a square or a circle.

7. A method for identifying the system for a two dimensional bar code having information units arranged in the form of a matrix for synchronous omni-directional information as claimed in claim 1, characterized in that, the identifying device identifies an input image of said system for a two dimensional bar code for synchronous omni-directional information in accordance with the following steps:

(1) determining its position in the image based on the characteristic shape and/or optical characteristics of a directing information unit;

(2) determining a linking line between each pair of the vertical synchronous information units and the horizontal synchronous information units based on the specific relative positional relationship of the directing information unit with the vertical synchronous information unit and the horizontal synchronous information unit as well as the optic characteristics of the vertical synchronous information unit and the horizontal synchronous information unit;

(3) reading optical characteristic information at or near the junction of the linking line between the centers of said pair of vertical synchronous information units and the intersection between said pair of horizontal synchronous information units; and (4) decoding the optical characteristic information at or near the junction read by step (3) in accordance with the order identified by the characteristic shape and/or optical characteristics of the directing information unit, so as to recover the coded information.

8. The method for identifying the system for a two dimensional bar code having information units arranged in the form of a matrix for synchronous omni-directional information according to claim 7, characterized in that, the optical characteristics for each unit are its color attribute and said base is the center of each unit.

9. The method for identifying the system for a two dimensional bar code having information units arranged in the form of a matrix for synchronous omni-directional information according to claim 7, characterized in that, the optical characteristics for each unit are its fluorescent attribute and said base is the center of each unit.

10. The method for identifying the system for a two dimensional bar code having information units arranged in the form of a matrix for synchronous omni-directional information according to claim 8, characterized in that, said vertical synchronous information units and horizontal synchronous information units are all distributed at said matrix border, and said directing information units are at the matrix vertex and the center of the border, the identifier determines the directing information unit at the border center by the directing information unit at neighboring matrix vertex.

11. The method for identifying the system for a two dimensional bar code having information units arranged in the form of a matrix for synchronous omni-directional information according to claim 10, characterized in that, each of said vertical synchronous information units, horizontal synchronous information units and coding information units is a square, said directing information unit is selected from a rectangle, a square or a circle, said identifier determines a scanning direction through comparing its geometric shape and its position.

12. The method for identifying the system for a two dimensional bar code having information units arranged in the form of a matrix for synchronous omni-directional information according to claim 11, characterized in that, the base location of the vertical synchronous information units and the horizontal synchronous information units at a border are determined by a border searching algorithm.

13. The method for identifying a two dimensional bar code having information units arranged in the form of a matrix for synchronous omni-directional information according to claim 9, characterized in that, said vertical synchronous information units and horizontal synchronous information units are all distributed at said matrix border, and said directing information units are at the matrix vertex and the center of the border, the identifier determines the directing information unit at the border center by the directing information unit at neighboring matrix vertex.

14. The method for identifying a two dimensional bar code having information units arranged in the form of a matrix for synchronous omni-directional information according to claim 13, characterized in that, each of said vertical synchronous information units, horizontal synchronous information units and coding information units is a square, said directing information unit is selected from a rectangle, a square or a circle, and said identifier determines a scanning direction through comparing its geometric shape and its position.

* * * * *